United States Patent [19]

Heppenstall et al.

[11] 4,150,416

[45] Apr. 17, 1979

[54] CONTROL CIRCUIT FOR A VEHICLE TRANSMISSION SYSTEM

[75] Inventors: Keith Heppenstall; Stephen A. White, both of London, England

[73] Assignee: Lucas Industries Limited, Birmingham, England

[21] Appl. No.: 887,470

[22] Filed: Mar. 17, 1978

[30] Foreign Application Priority Data

Mar. 26, 1977 [GB] United Kingdom ............... 12792/77

[51] Int. Cl.² ........................................... H01H 47/32
[52] U.S. Cl. ...................................... 361/193; 74/365
[58] Field of Search ...................... 361/191, 193, 196; 74/365

[56] References Cited

U.S. PATENT DOCUMENTS 3,618,417  11/1971  Brown ........................... 361/193 X
3,652,901  3/1972  Wakamatsu et al. ................. 361/193

Primary Examiner—Harry E. Moose, Jr.

[57] ABSTRACT

A control circuit for a vehicle transmission system having a multi-ratio gearbox the individual ratios of which are obtained by energizing one of a plurality of solenoids by means of a selector switch. The control circuit is connected to a source of supply by means of a master switch and circuit means is provided to prevent energization of the solenoids in the event that the selector switch is left in a selection position prior to closure of the master switch.

13 Claims, 1 Drawing Figure

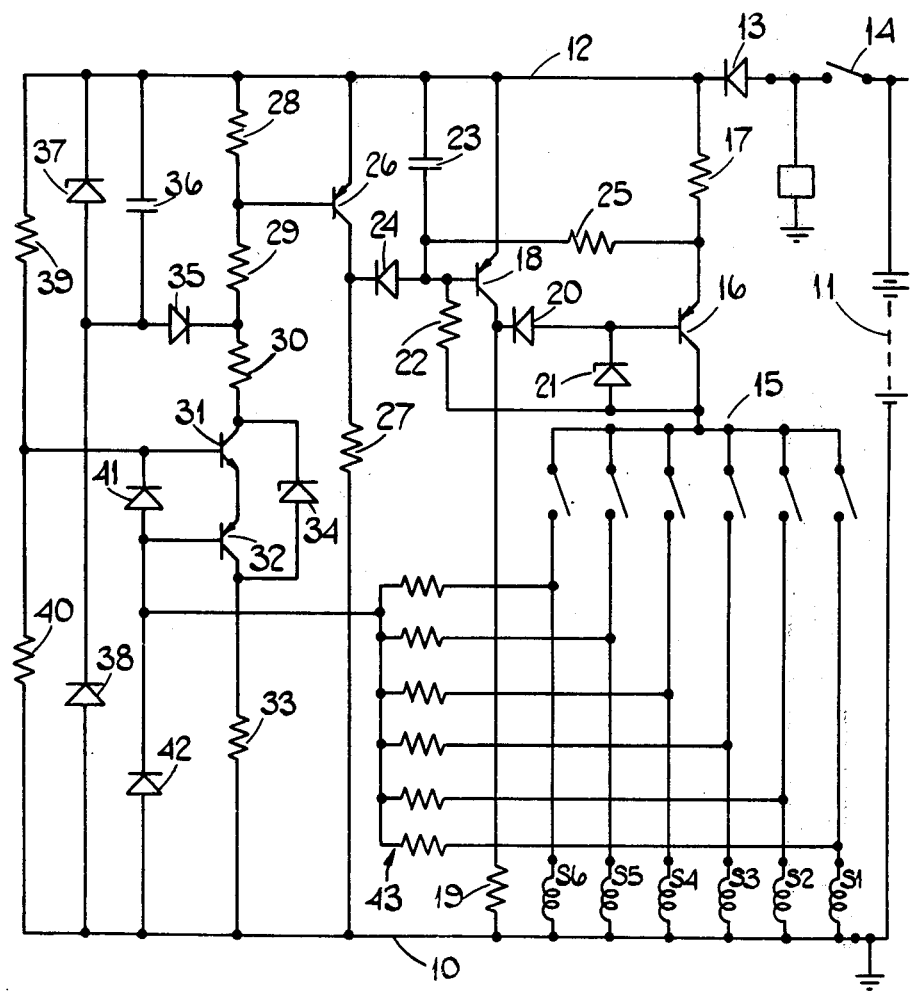

CONTROL CIRCUIT FOR A VEHICLE TRANSMISSION SYSTEM

This invention relates to a control circuit for a vehicle transmission system having a multi-ratio gearbox the individual ratios of which are selected by energisation of a respective one of a plurality of solenoids, the control circuit including a manually operable selector switch having a plurality of selection positions in one of which a respective one of the solenoids will be energised, the selector switch also having a neutral position in which none of the solenoids will be energised.

Such control circuits are well known and the power supply for the control circuit is taken through a master switch which is operable by the driver of the vehicle when he leaves the vehicle, to disconnect the electric supply to various circuits which are required or may be required to function when the vehicle is in operation. In order to stop the vehicle it is the recommended practive to slow the vehicle using the gearbox and as the vehicle is brought to rest, to put the selector switch into the neutral position so that none of the ratios of the gearbox are energised. Thereafter the master switch can be opened. What often happens however is that the driver slows the vehicle using the gearbox and then instead of moving the selector switch to the neutral position, opens the master switch and leaves the selector switch in a gear selection position. The gearbox does of course assume a neutral condition but when the vehicle is next required for use, closure of the master switch causes immediate energisation of one of the solenoids which if the engine is running, may cause the vehicle to move forward in an unexpected and possibly dangerous manner.

The object of the present invention is to provide a control circuit for the purpose specified in a simple and convenient form.

According to the invention a control circuit of the kind specified comprises a first transistor having its collector emitter path connected in series with said switch, base drive means for said first transistor, a second transistor which when conducting removes the base drive to the first transistor, timing means operable when the circuit is connected to a source of electric supply, to turn said second transistor on and then off, and a base drive circuit for said second transistor which in the event that said selector switch is in a selection position when the control circuit is connected to the source of supply, provides base drive to said second transistor and maintains it in a conducting state irrespective of the timing means.

One example of a control circuit in accordance with the invention will now be described with reference to the accompanying circuit diagram. Referring to the diagram the control circuit comprises a supply line 10 which is in use, connected to the negative terminal of a source of supply conveniently the storage accumulator 11 of the vehicle. A supply line 12 is also provided and this is connected by way of a diode 13 and a master switch 14 to the positive terminal of the storage accumulator. The diode 13 is provided for the purpose of protecting the circuit in the event that the storage accumulator is incorrectly connected.

Also shown in the circuit diagram are six solenoid windings referenced S1–S6. The gearbox is of the type such that when one solenoid is energised, the respective gear ratio will be engaged.

The control of electric current through the solenoids is by way of a selector switch generally indicated at 15 and which is controlled by the driver of the vehicle. The selector switch is constructed so that only one solenoid may be energised at any one time. Moreover, the selector switch has a neutral position. The selector switch is connected to the supply line 12 by way of the emitter collector path of an p.n.p transistor 16 which is connected in series with a resistor 17, the resistor being interposed between the emitter and the line 12. A second p.n.p transistor 18 is provided having its emitter connected to supply line 12 and its collector connected to terminal 10 by way of a resistor 19. The collector of the transistor 18 is connected to the cathode of a diode 20 the anode of which is connected to the base of transistor 16. Mowever, the base of the transistor 16 is connected to the cathode of a zener diode 21 the anode of which is connected to the collector of the transistor 16. The base of the transistor 18 is connected to the collector of transistor 16 by way of a resistor 22, to the supply line 12 by way of a capacitor 23, to the anode of a diode 24 and to the emitter of transistor 16 by way of a resistor 25.

A third p.n.p transistor 26 is provided having its emitter connected to line 12 and its collector to line 10 by way of a resistor 27, the cathode of the diode 24 also being connected to the collector.

A series circuit is connected between lines 10 and 12 and starting from line 12 comprises a resistor 28, a further resistor 29 and a still further resistor 30 the latter being connected to the collector of an n.p.n transistor 31 having its emitter connected to the emitter of a p.n.p transistor 32. The collector of transistor 32 is connected to the line 10 by way of a resistor 33 and the collectors of the transistors 31 and 32 are bridged by a zener diode 34 having its anode connected to the collector of transistor 32. The base of transistor 26 is connected to a point intermediate the resistors 28 and 29 and a point intermediate the resistors 29 and 30 is connected to the cathode of a diode 35 which has its anode connected to line 12 by way of a capacitor 36. In addition the anode of diode 35 is connected to the anode of a zener diode 37 the cathode of which is connected to line 12. Moreover, the anodes of diodes 35 and 37 are connected to the cathode of a further diode 38 having its anode connected to supply line 10.

A potential divider comprising resistors 39, 40 connected in series is provided between the lines 10 and 12 and a point intermediate these resistors is connected to the base of transistor 31. The base of transistor 31 is connected to the cathode of a diode 41 which has its anode connected to the base of transistor 32 and also to the cathode of a diode 42 having its anode connected to the supply line 10. In addition, the cathode of diode 42 is connected to one end of six resistors generally indicated at 43 and the other ends of these resistors are connected to the ends of the solenoid windings S1–S6 respectively.

The operation of the circuit will now be described appreciating that it can perform a number of protection functions which it is hoped will become apparent once its mode of operation has been appreciated.

Assuming for the moment that the selector switch 15 is in the neutral position and the master switch 14 is closed. In this situation resistor 19 provides by way of diode 20, base drive to transistor 16 however, no collector emitter current flows because the selector switch 15 is in the neutral position. Moreover, at the instant of closure of the master switch 14, the capacitors 23 and 36 are discharged so that initially transistors 18 and 26 will be held in a non-conductive state. It is arranged that capacitor 23 which is charged by way of diode 24 and resistor 27, charges at a higher rate than capacitor 36 and during the charging process a point is reached at which transistor 18 is turned on. With transistor 18 saturated the base drive is removed from transistor 16 however, as capacitor 36 continues to charge a point is reached at which transistor 26 is turned on so that base drive is removed from transistor 18 as soon as capacitor 23 is discharged. Transistor 18 therefore ceases to conduct and base drive is restored to transistor 16. If now one of the selector switches is closed then the appropriate solenoid is energised and the respective gear ratio of the gearbox selected. It should be noted that when one of the solenoids is energised most of the supply voltage is developed across the respective solenoid so that no base drive is applied to transistor 18 by way of resistor 22.

The sequence of operation above describes what should happen. If, however, the selector switch 15 is in a selection position when the master switch 14 is closed then it is arranged that transistor 18 remains in its conducting state and thereby transistor 16 can never properly conduct so that the selected soldenoid does not become energised. Considering again the sequence of operations. When the master switch 14 is closed transistor 16 receives base drive through the resistor 19 and starts to conduct. However, capacitors 23 and 36 also start to charge as previously described and transistor 18 is turned on thereby depriving transistor 16 of base drive so that collector emitter current no longer flows and the solenoid is de-energised. As described above the duty of transistor 26 is to turn off transistor 18 and it does this by removing base drive. However, in the situation described with the selector switch in a selection position and transistor 16 in a non-conducting state, resistor 22 can provide base drive to transistor 18 and it does this when transistor 26 conducts. The situation therefore exists that transistor 16 is held in its non-conducting state so that whilst there was an initial flow of current in the selected one of the solenoids, this occurs for a very short time only and for a time length insufficient to cause actual selection of the gear ratio. The circuit therefore becomes latched and the only way of unlatching the circuit is to move the selector switch to the neutral position. Once this is done the base drive to transistor 18 by way of resistor 22 is removed and it ceases to conduct thereby allowing transistor 16 to conduct. The circuit then operates as previously described. Thus it will be seen that if the selector switch is in a selection position or is put into a selection position before transistor 18 has been turned off then transistor 18 will remain saturated and will prevent conduction of transistor 16 and thereby current flow in the solenoid.

The circuit does provide for cutting off transistor T16 in two fault situations. One of these situations is where because of a fault an excessive current flow occurs through transistor 16 and the associated series circuit. Such excessive current flow may be due to a fault in the wiring connecting the solenoids. If this should happen then the voltage developed across resistor 17 will increase and transistor 16 will no longer remain saturated and it will move into its constant current region of operation. Moreover, resistor 25 in conjunction with resistor 22 act in this situation to turn transistor 18 on and once this is done base drive is removed from transistor 16 and the flow of current ceases. Transistor 18 remains in its conducting state by virtue of the base drive through resistor 22, the selector switch and the selected one of the solenoids.

The other situation is where due to some fault two solenoids are energised at one time. This is dangerous and can result in damage to the gearbox. Such a fault may be due to a wiring fault or to a fault in the selector switch. This type of fault is sensed utilising the resistors which are collectively indicated at 43. When only one solenoid is energised the voltage at the common point of resistors 43 will be the voltage determined by the potential divider formed by one of these resistors in series with the other resistors connected in parallel through the respective solenoids. If however, two solenoids are energised then the potential divider comprises two resistors in parallel and in series with the remaining resistors and respective solenoids in parallel. Thus when two solenoids are energised the voltage at the common point will be increased.

The voltage at the common point of the resistors 43 is applied to the base of transistor 32 and under normal circumstance the reference voltage provided by the resistors 39 and 40 and which is applied to the base of transistor 31 is such that the difference between these two voltages forward biases the base emitter junctions of transistors 31 and 32, and sufficient current is drawn through the base of transistor 26 to maintain that transistor in the saturated state. If the voltage at the common point of resistors 43 increases as described then transistors 31 and 32 are biased into the cut off state so that transistor 26 is also cut off thereby allowing transistor 18 to conduct. This in turn renders transistor 16 non-conducting and transistor 18 is maintained in its conducting state by base drive provided by resistor 22.

Diodes 41 and 42 are provided to protect transistors 31 and 32, diode 41 guarding against excessive reverse bias and diode 42 guarding against back e.m.f voltages when a solenoid is switched off. Zener diodes 21 and 34 guard against surges in the supply voltage and diode 38 provides a discharge path for capacitor 36 in conjunction with resistors 39 and 40 when the master switch 14 is opened. Zener diode 37 determines the maximum voltage to which the capacitor 36 may be charged.

We claim:

1. A control circuit for a vehicle transmission system having a multi-ratio gearbox the individual ratios of which are selected by energisation of a respective one of a plurality of solenoids, the control circuit including a manually operable selector switch having a plurality of selection positions in one of which a respective one of the solenoids will be energised, the selector switch also having a neutral position in which none of the solenoids will be energised, a first transistor having its collector emitter path connected in series with said switch, base drive means for said first transistor, a second transistor which when conducting removes the base drive to the first transistor, timing means operable when the circuit is connected to a source of electric supply, to turn said second transistor on and then off, and a base drive circuit for said second transistor which in the event that said selector switch is in a selection position when the control circuit is connected to the source of supply, provides base drive to said second transistor and maintains it in a conducting state irrespective of the timing means.

2. A control circuit according to claim 1 in which said base drive circuit for said second transistor includes a first resistor which can be connected to a supply terminal of said source of supply by way of said selector switch and one of said solenoids, said resistor providing base drive to said second transistor to maintain it in the conducting state in the event that said selector switch is in a selection position when the control circuit is connected to the source of supply.

3. A control circuit according to claim 2 in which said timing means includes a third transistor, a second resistor in the collector emitter path of said third transistor, a first capacitor which is charged through said second resistor when said third transistor is in a non-conducting state, the voltage developed across said first capacitor providing base drive to said second transistor, and means for turning said third transistor on a predetermined time after the second transistor has been rendered conductive thereby to turn said second transistor off.

4. A control circuit according to claim 3, in which said first capacitor is connected in parallel with the collector emitter path of said second transistor through a diode poled to prevent discharge of said first capacitor through said third transistor when the latter is in a conducting state.

5. A control circuit according to claim 3, in which said means includes a second capacitor and a charging circuit for said second capacitor the charging rate of said second capacitor being arranged to be greater than that of the first capacitor.

6. A control circuit arranged to claim 2, including a third resistor through which base drive can be supplied to said second transistor to turn said second transistor on and thereby the first transistor off, in the event that the amount of flow through said first transistor exceeds a predetermined value.

7. A control circuit according to claim 6 in which said selector switch and the solenoids are connectd in the collector circuit of said first transistor, the control circuit including a fourth resistor through which the emitter of the first transistor is connected to another supply terminal of said source of supply, said third resistor being connected between the base of the second transistor and the emitter of the first transistor.

8. A control circuit according to claim 3, including means for turning said third transistor off in the event that two or more of said solenoids are energised.

9. A control circuit according to claim 8, in which said means includes a plurality of resistors connected at one end to terminals of the solenoids respectively which are connected to the selector switch, the other ends of said plurality of resistors being connected together to a common point, the voltage at said common point increasing from one level when one solenoid is energised to a second level or levels when two or more solenoids are energised.

10. A control circuit according to claim 9, including a transistor network to which the voltage at said common point is supplied, means for supplying a reference voltage to said transistor network, said transistor network acting to maintain base drive to said third transistor when the voltage at the common point is at or below said one level, said transistor network acting to remove base drive from said third transistor when the voltage at the common point rises to said second level.

11. A control circuit according to claim 10, in which said transistor means comprises a pair of transistors of opposite polarity having their collector emitter paths connected in series, said reference voltage being applied to the base of one of said pair of transistors, the base of the other transistor being connected to said common point whereby when the voltage at said common point is at or below said one level said pair of transistors will be in a saturated state and when the voltage of said common point increases to said second level the transistor will become non-conducting.

12. A control circuit according to claim 11, in which the collector emitter paths of said pair of transistors are connected in series with a resistor chain having a first tapping connected to the base of said third transistor and a second tapping connected to one plate of said second capacitor through a diode poled to permit said second capacitor to charge through the remaining resistor portion of said chain and said pair of transistors.

13. A control circuit according to claim 11, including a further diode through which said second capacitor can discharge when the control circuit is disconnected from said source of supply.

* * * * *